(12) United States Patent
Noble et al.

(10) Patent No.: US 6,996,570 B2
(45) Date of Patent: Feb. 7, 2006

(54) DATA STORAGE SYSTEM HAVING A UNIFIED CONTAINER LAYER FOR AN ACTIVE DATA STORE

(75) Inventors: Gary Paul Noble, Nr Broadway (GB); Peter John Stretton, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 10/231,890

(22) Filed: Aug. 28, 2002

(65) Prior Publication Data

US 2003/0046479 A1    Mar. 6, 2003

(30) Foreign Application Priority Data

Sep. 1, 2001    (GB)    .................................... 0121252

(51) Int. Cl.
*G06F 17/30* (2006.01)

(52) U.S. Cl. ...................................... 707/100; 713/317

(58) Field of Classification Search .................... 707/1, 707/200, 204, 9, 10, 126, 100; 709/225; 719/313–317
See application file for complete search history.

(56) References Cited

U.S. PATENT DOCUMENTS

| | | | | |
|---|---|---|---|---|
| 5,119,465 A | * | 6/1992 | Jack et al. | .................. 717/137 |
| 5,561,769 A | * | 10/1996 | Kumar et al. | ................ 709/202 |
| 5,701,423 A | * | 12/1997 | Crozier | ........................ 715/762 |
| 5,734,905 A | * | 3/1998 | Oppenheim | .................. 719/315 |
| 5,862,325 A | * | 1/1999 | Reed et al. | .................. 709/201 |
| 6,085,203 A | * | 7/2000 | Ahlers et al. | ............... 715/523 |
| 6,192,405 B1 | * | 2/2001 | Bunnell | ....................... 709/225 |
| 6,202,099 B1 | * | 3/2001 | Gillies et al. | ............... 719/317 |
| 6,343,287 B1 | * | 1/2002 | Kumar et al. | .................. 707/4 |
| 6,549,916 B1 | * | 4/2003 | Sedlar | ........................ 707/200 |
| 6,560,592 B1 | * | 5/2003 | Reid et al. | ..................... 707/2 |
| 6,681,383 B1 | * | 1/2004 | Pastor et al. | ................ 717/126 |
| 6,718,332 B1 | * | 4/2004 | Sitaraman et al. | .......... 707/102 |

* cited by examiner

*Primary Examiner*—Mohammad Ali
*Assistant Examiner*—Sheree Brown
(74) *Attorney, Agent, or Firm*—Schmeiser, Olsen & Watts; William E. Schiesser

(57) ABSTRACT

The present invention provides a data storage system, method and computer program product having an active data store and a data communication mechanism comprising a unified container layer for validating both externally-generated data and data generated within the active data store, wherein the unified container layer transmits and receives data using the data communication mechanism. In a preferred embodiment, the active data store is an entity-relationship-attribute data store which comprises a relational database. The unified container layer may validate data using a syntax checker and a semantics checker, which may comprise a rules engine. Preferably, the data communication mechanism is one of a publish/subscribe system, a synchronous communication system, and an asynchronous communication system.

15 Claims, 4 Drawing Sheets

DATA STORAGE SYSTEM HAVING A UNIFIED CONTAINER LAYER FOR AN ACTIVE DATA STORE

FIELD OF THE INVENTION

The present invention relates to the field of data storage systems having active or intelligent data stores. The invention is particularly advantageous when implemented in two or more of such data storage systems connected together over communications links.

BACKGROUND OF THE INVENTION

The art of computing has advanced greatly since the days of Charles Babbage. The innovations of Turing, von Neumann and their like have been overshadowed in recent years by the development of what has come to be described as machine intelligence.

In the field of machine intelligence, the concept of an active data store (sometimes referred to as an intelligent data store or database) is known. An active data store is one in which a rules engine or an equivalent active component can apply rules or event-based triggers to data and thereby modify that data in some way based on inferences drawn from the combination of data and rules.

Active data stores may take the form of simple file systems such as are found in an operating system's file system in personal computers. These may also be organized as hierarchical database systems controlled by a hierarchical database management system, or as relational, object-oriented or text databases.

To take a simple example, consider a data store in the form of a database storing data about family relationships. If a new data item representing a new-born child is added to the database, it might be related to existing data about a person thus:

Bob is-a-child-of Alice

The rules engine responds to the arrival of this new data by examining the assertion that Bob is a child of Alice. It examines its store of rules, and finds that a rule exists that if Bob is a child of Alice, Alice must be a parent of Bob. It locates and examines the data for the entity Alice, but finds no such assertion in the data. It therefore triggers a change to the entity Alice to include the assertion:

Alice is-a-parent-of Bob

Originally, active data stores were used experimentally and in relatively closed environments; a typical example was a rule-based active database to allow pharmaceutical products to be selected for a patient, using predetermined rules to take into consideration any contraindications and possible conflicts between drugs prescribed for a patient. The data store was typically not self-modifying; that is, the rules were not used to cause changes to the data, but only to select and extract data. The data store thus contained very stable data. The rules engines of these systems were designed to select data by traversing the data store following a tree-structured rules hierarchy, and thereby to satisfy a user's query.

It is well-known in the art to have entity-relationship databases for storing data in the form of networks of relationships and deriving information from the database, for example, by using visual navigation means. In such databases, relationships and entities are provided with attributes, and these attributes in turn can be used to derive information from the database. Conventionally, it is possible to use rule based processing to examine relationships, entities and attributes and derive further facts, such as higher and lower level structural relationship information therefrom.

More recently, active data stores have been implemented to interact with applications and with middleware, such as transaction processing monitors and workflow processing systems. Also, the ability of active data stores to modify data and to propagate modifications to both data and rules, based on the cascading of rule-based changes, has been enhanced. The use of active data stores has become increasingly important in information-based and service-provider industries in which knowledge management is a central feature of the business. An example of this is in the area of provision of computer solutions, comprising hardware and software, in which the provider adds value by incorporating industry-specific know-how in optimizing the operation of the total solution. By way of example, consider a computer solutions provider who enters a bid to supply a complete business management solution to the insurance industry. The experience of previous engagements in the same industry and of the integration techniques utilized to provide the best possible combination of hardware and software can now be captured and stored in a data store, and retrieved for each new engagement, such that the system architect and the system builders do not need to reinvent or rediscover that knowledge anew in each instance. Moreover, the knowledge can be formulated according to standard templates, such that a newly-hired or inexperienced participant can easily retrieve it and thus attain expert performance without the very significant time and effort that would otherwise have been involved in learning that knowledge from the start.

Furthermore, if such a system is constructed to use an active data store as a repository of knowledge, rules-based processing can be applied to the data to structure and relate elements of raw data into usable structured information. Changes to data and to the rules can trigger rules-based processing to change the data and the information structures as circumstances in the real world of the insurance business change, thus maintaining an accurate informational reflection of reality. Typically, now, the data store is associated with input mechanisms for accepting and applying changes to data and rules that have been entered by a local or remote user or passed in by an application program, a rules engine adapted to directly modify data by applying rules, and output mechanisms for passing information to users and applications, such as report writers or transactional programs. The input mechanisms conventionally contain validation or filtering mechanisms to check the validity of the data, both in terms of syntax and in terms of consistency of semantics. For example, they may test the syntax of the input to ensure that it is well-formed with respect to the syntactic structure of the database. They may also carry out some semantic validation to check that the data is meaningful, as, for example, checking that Alice is older than Bob by comparing the age attribute data values for Bob and Alice, before it will allow the input to be applied to the database.

The input mechanisms may also require other forms of validation of any existing data or rules that are to be changed. For example, they may be constrained when in communication with commercial applications, to ensure that changes are recoverable by cooperating with a recovery logging system. Similarly, they may be constrained when in communication with a transaction processing system, to abide by the rules for transactional changes to databases.

When in communication with a workflow system, cooperation may be needed with the workflow system in ensuring that changes made during long-running workflows are compensable.

However, in an active entity-relationship-attribute database, in which rule-based processing is taking place to dynamically add, modify or delete data (and possibly rules) according to changes in circumstances—new relationship linkages, for example, being derived from rule-based reasoning about existing structures, content or rules—structures or meanings may become ill-formed as a result of internally-generated changes, which causes problems in subsequently deriving meaningful information from the database. The problem is particularly acute when cascades of changes are made to the data as a result of the sequential application of rules, the first application being triggered by a new input and each subsequent application triggered by a previous change. It is easy to see that validation of the initial input is not sufficient to maintain order in the database. Heretofore, a solution to the aforementioned problems has been thought to be one which would require the addition of greater and greater complexity to the rules engine and to the various input mechanisms to enforce validations during internally-generated changes as well as externally-generated changes. It is quite a complex system design and programming task to provide meta-rules to control the validation of rule-based changes to data. It is an even more complex system design and programming task to provide meta-meta-rules to control the validation of rule-based changes to rules.

It is believed, therefore, that a data storage system which provides the many advantages taught herein would obviate many of the problems and limitations described hereinabove, and would constitute a significant advancement in the art.

OBJECTS AND SUMMARY OF THE INVENTION

It is a primary object of the present invention to enhance the art of operating data storage systems.

It is another object of the invention to provide a data storage system which functions in a new and unique manner, compared to known such systems.

In accordance with one embodiment of the invention, there is provided a data storage system comprising a link to a data communication mechanism and an active data store including a rules engine, and a unified container layer for validating both externally-generated data and data generated by the rules engine of the active data store, wherein the unified container layer is adapted to transmit and receive data using the data communication mechanism.

In accordance with another embodiment of the invention, there is provided a method for operating a data storage system comprising linking to a data communication mechanism, validating, in a unified container layer, both externally-generated data and data generated by a rules engine of an active data store, and transmitting and receiving data by the unified container layer using the data communication mechanism.

In accordance with yet another embodiment of the invention, there is provided a computer program product comprising computer program instructions tangibly embodied in a computer-readable medium, to, when loaded into a computer system and executed, cause the computer system to operate a data storage system by linking to a data communication mechanism, validating, in a unified container layer, both externally-generated data and data generated by a rules engine of an active data store, and transmitting and receiving data by the unified container layer using the data communication mechanism.

BRIEF DESCRIPTION OF THE DRAWINGS

The above and other objects, features and advantages of the present invention will be better understood by reading the following more particular description of the invention in conjunction with the accompanying drawings wherein.

DETAILED DESCRIPTION OF THE INVENTION

Figure 1:
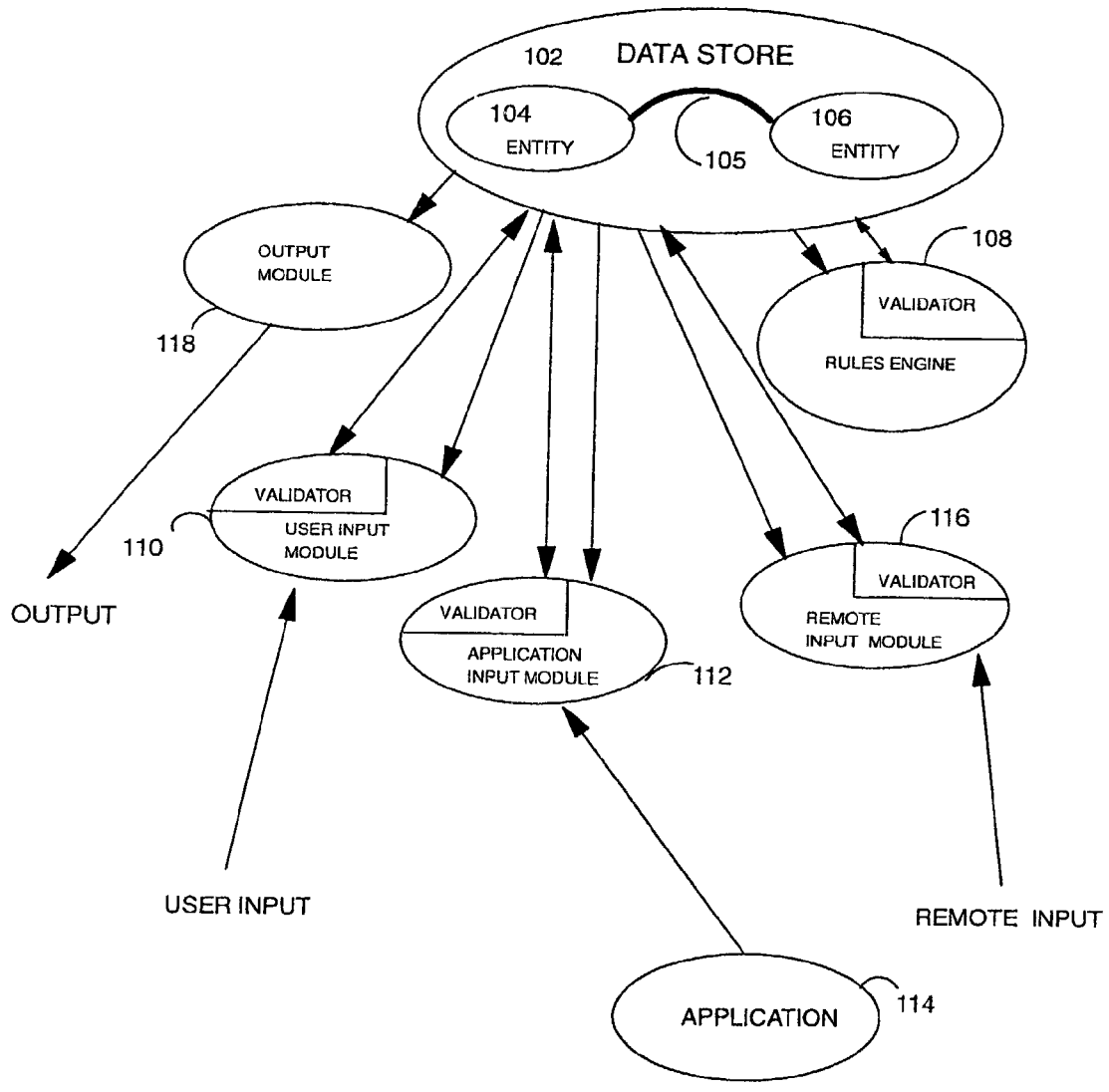
FIG. 1 is a schematic diagram showing the components of an active data store according to the prior art.

As can readily be seen from FIG. 1, a data store according to the prior art typically comprises entities 104 and 106 which may be connected by relationship 105. Additionally, but not shown in the Figures for the sake of simplicity of representation, entities and relationships may have attributes. The data storage system according to the prior art is an Entity-Relationship-Attribute database. In such a database, data items representing entities may be provided with data values that assert a relationship with another data item, and both entities and relationships may have attributes. In our earlier example, Bob and Alice are entities, while is-a-child-of and is-a-parent-of are relationships, and the age values for Bob and Alice are attributes. In a more detailed version of our example database, the relationship is-a-child-of might also have an attribute; for example, it could have one of the set:

{only, first, second . . . nth} to define Bob's position in the family relative to any siblings.

Changes to the database may be initiated by user input through user input module 110 or component, typically implemented as a computer program having an input-output user interface, and conventionally further comprising a validator. Changes may also be initiated by application 114 through an application input module having a validator, or by remote input through remote input module 116, also conventionally having a validator. The validators may comprise filters and syntax checkers, and may also comprise semantic validity checking means. Conventionally, the rules for use by the rules engine are themselves stored as data in the database, and are usually referred to as metadata. This metadata is conventionally accessible to input modules 110, 112 and 116 in read mode, so that it can be accessed by the input modules to ascertain the requirements for validity during checking of input by the validators in the input modules. Conventionally, it is also accessible in write mode, so that new validation requirements can be added or existing ones changed by means of the same input modules.

Changes to the database may also be initiated by rules engine 108, which also has a validator. The above-mentioned metadata is conventionally accessible to the rules engine in read mode, so that it can be accessed by the rules engine to ascertain the requirements for validity during checking of input by the validator in the rules engine. Conventionally, it is also accessible in write mode, so that new validation requirements can be added or existing ones changed by means of the rules engine. Validators associated with the rules engine and the input modules are in two-way communication (read/write mode) with data store 102, so that they can both write data and metadata to data store 102 after validation, and read metadata from the data store before validating input data. In addition, rules engine 108 and input modules 110, 112 and 116 are in one-way communication (read mode) with data store 102, so that they can read existing data which is to be updated. Data store 102 also communicates with at least one output module 118 for outputting data to applications such as report writers and data analysis programs, and to other data storage systems.

Figure 2:
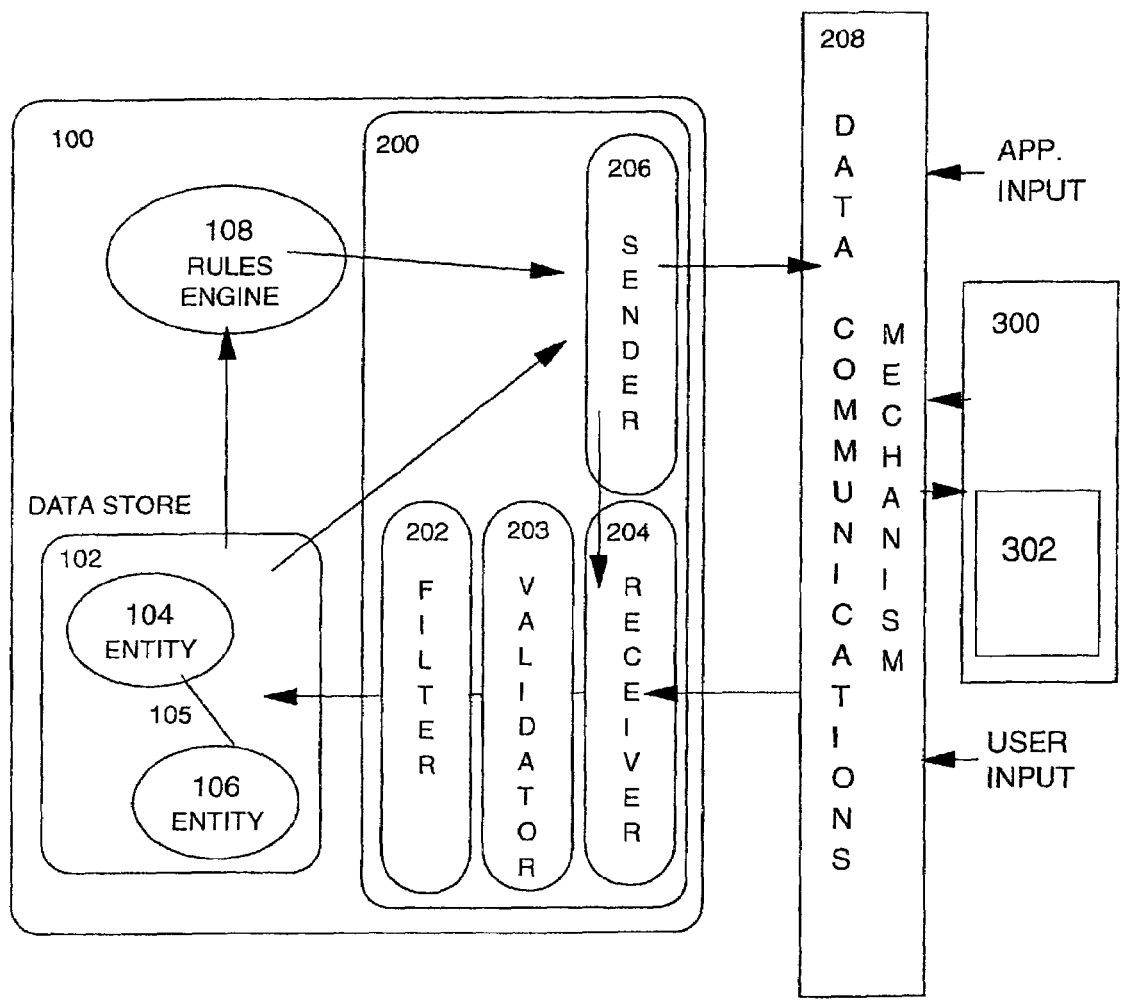
FIG. 2 is a schematic diagram showing the components of an active data storage system according to one embodiment of the present invention.

Turning now to FIG. 2, it will be seen that data storage system 100 of a preferred embodiment of the present invention comprises data store 102 having entities 104 and 106 which may be connected by relationship 105.

The plurality of input modules 110, 112 and 116 and the associated validators of the prior art (shown in FIG. 1) have been replaced by unified container layer 200, in which is also incorporated validator 203 for, inter alia, rules engine 108 and filter component 202.

In a preferred embodiment of the present invention, metadata representing the rules is stored in the same database as the data itself, and is represented either in the form of template entities, relationships and attributes, or in the form of instructions, whether embodied as procedural instructions or as objects (as in an object-oriented environment).

Unified container layer 200 comprises filter component 202, validator 203 and receiver 204 for all types of input to the data storage system.

Unified container layer 200 further comprises sender 206 and receiver 204, both of which are adapted to communicate using data communication mechanism 208. Links between receiver 204, sender 206 and mechanism 208 are shown as arrows. Data communication mechanism 208 is further adapted to receive data from application inputs and user inputs, and no direct access to the data store is permitted for these inputs. Data communication mechanism 208 may, in a preferred embodiment, comprise a publish and subscribe data communication mechanism. According to this preferred embodiment, data communications mechanism 208 is in data communication with broker 300 using a preferred publish and subscribe mechanism, in which broker 300 acts as a bus in that it receives published messages by means of transmissions across data communication mechanism 208 and makes them available by means of transmissions across data communications mechanism 208 to subscribers, wherein subscribers may comprise data storage systems 100 or any other application or system that has registered as a subscriber with broker 300. Broker 300 stores subscription data relating subscriber identifiers with subscribed-to topics in its data storage means 302.

Data communication mechanism 208, in cooperation with broker 300, thus operates as if it were a data bus, through which all communications with unified container layer 200 of data storage system 100 are conducted.

A preferred embodiment of the present invention uses the Extensible Markup Language (hereinafter referred to as "XML") or a similar markup language as the vehicle for communicating data change information, since the parsable tree structure of such languages is very suitable both for facilitating simplified syntax checking and for representing the semantics of entity-relationship-attribute data. XML is also becoming standardized for various purposes, which gives the further advantage of improving the interoperability of systems that are able to use it for input and output. For example, there are emerging standards for XML document types corresponding to various conventional commercial and financial documents, allowing standardized interchanges to take place for the purposes of electronic commerce. Furthermore, the construction of parse trees for various types of data structures is rendered relatively easily by the facilities built into the available XML tools. XML, being extensible, also advantageously allows for the definition of new data types, thus permitting greater flexibility in dealing with change.

Thus, the unified container layer preferably receives all kinds of input in the form of XML structured publish/subscribe messages, parses the structured messages, and then applies any semantic or other additional validation logic before permitting the data in the database to be changed. However, one skilled in the art will readily understand that many other embodiments of unified container layers can be created according to the present invention in relation to any other form of input that may be subject to validation. For example, other structured languages, such as Hypertext Markup Language (also known as "HTML") may be used, as may other standard or proprietary languages or data formats. These need not take the form of tagged descriptive languages, but may be any type of externally-defined or self-defining data format.

The unified container layer may additionally incorporate other functions than validation and filtering. For example, it may contain data compression and decompression functions, data encryption and decryption functions, or the like.

By means of the subscription mechanism of the preferred publish and subscribe system, each connected data storage system can have its learning goals defined in accordance with its own data model and can thus select how its data and rules may change to reflect the real-world equivalents of its informational content. The informational content of a data store according to a preferred embodiment of the present invention can thus be adjusted to match a changing environment.

Furthermore, each data or rule change to one data storage system, regardless of its origin, whether it is a local or remote application input, a user input, or an internally-generated, rule-based change, is made available to all interested participant systems by publishing it so that all other subscribers can receive it, in addition to the originating data storage system. Thus, for example, a user input at data storage system 100 is entered using data communication mechanism 208. In prior art systems, such an input would only affect the local data storage system, but in systems according to the preferred embodiment of the present invention, the input is available to all interested subscribers, including for example, other data storage systems that have subscribed to the relevant topic and are connected to data communication mechanism 208.

The input to a local system may always be published to a broker, but for efficiency at the local system, a copy of the local system's subscriptions may be held locally, and all local user and application inputs for topics which the local system has subscribed to may be passed directly to the local unified container layer. This shortens the pathlength of the local inputs, but has the disadvantage of duplicating the subscription list at the local level, which may lead to mismatches when updates to the subscription list take place.

It may therefore be preferable to have the broker retain the only copy of a data storage system's subscription list and accept the additional pathlength entailed by transmitting all local inputs to the broker for the broker to transmit to all subscribers including the local data storage system. In an alternative embodiment, the publishing of the local system's inputs may also be selective; some local changes may be known to be of no interest outside the local data storage system.

Figure 3:
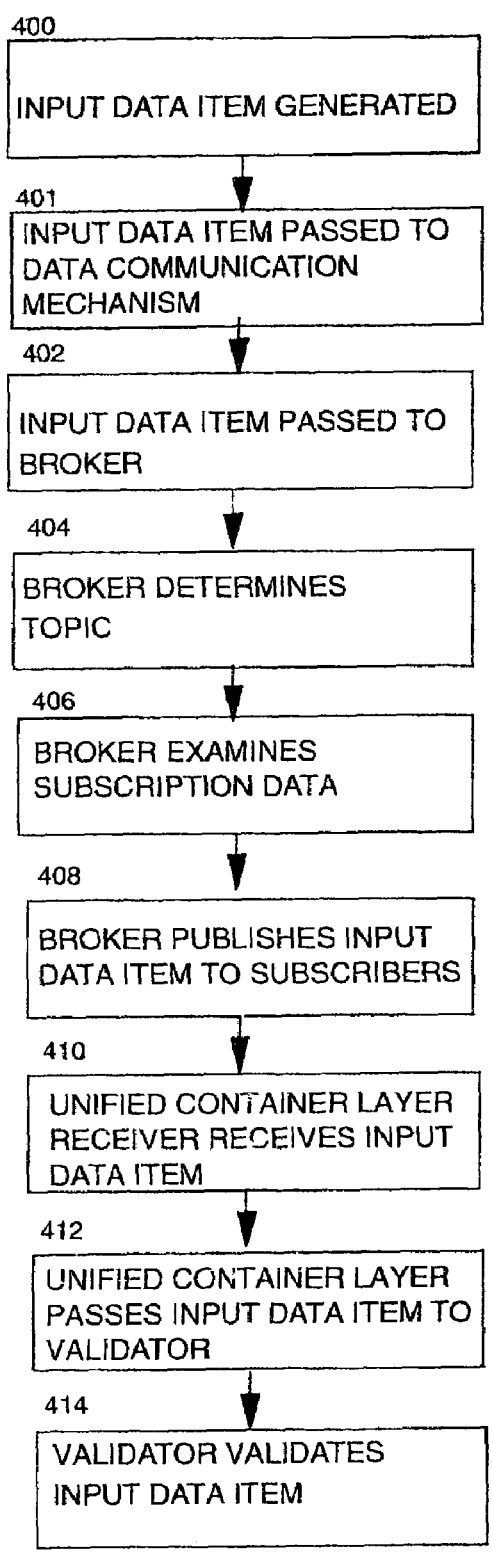
FIG. 3 is a flow diagram showing the steps of a method according to one embodiment of the present invention.

Shown in FIG. 3 is the sequence of steps of a method by which a change is made to a data item in data store 102 of a data storage system according to a preferred embodiment of the present invention. At step 400 an input data item is generated. This may be as a result of user input at, for example, a client personal computer system that is in communication with data communication mechanism 208, as a result of application input from a local or remote application, or as a result of a rule-based change generated within data storage system 100. At step 401, the input data item is passed to data communication mechanism 208, either by local or remote application input means, user input means, or by rules engine 108, which passes all input data items generated as a result of rules processing to unified container layer 200, in which sender 206 acts to transmit the input data item to data communication mechanism 208. At step 402, data communication mechanism 208 passes input to broker 300, which at step 404 determines the topic associated with the input data item. At step 406, broker 300 examines its subscription data in data store 302 and determines that the originating data storage system 100 has subscribed to the topic, as has a remote data storage system (not shown). At step 408, broker 300 publishes the input data item by transmitting it to subscribers, including originating data storage system 100 and the remote data storage system, as well as to any other subscribers, which may be other applications, databases, and so on. At step 410, receiver 204, which forms part of unified container layer 200 at data storage system 100 receives the input data item. At step 412, receiver 204 passes the input data item to validator 203. Validator 203, at step 414, performs validation, which may comprise syntax checking, semantic checking, testing for compliance with other requirements, and so on. Filtering of the input data item is then performed by filter component 202. Other requirements of input data items that cause changes to data or rules may comprise transactionality requirements, recoverability requirements, data translation or transformation requirements, and the like.

Figure 4:
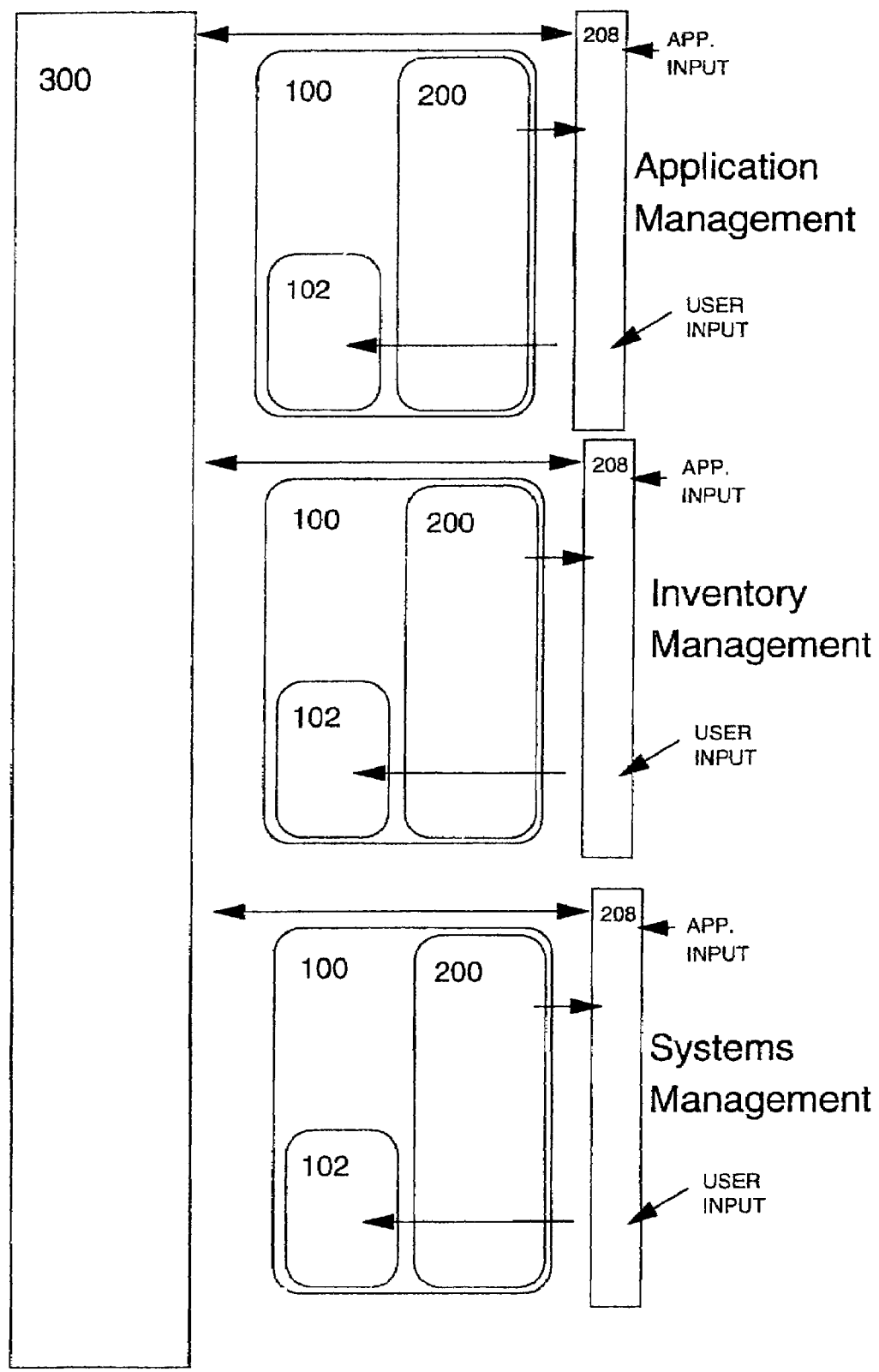
FIG. 4 is a schematic diagram showing the interacting structure of a communicating set of active data storage systems according to one embodiment of the present invention.

Turning now to FIG. 4, an exemplary application of a preferred embodiment of the present invention is shown, in which a set of data storage systems 100 have data stores 102 and unified container layers 200. Arrows show data storage systems 100 linking to data communications mechanisms 208, which may comprise a mechanism for communicating with broker 300 in a publish/subscribe environment. (In FIG. 4, the set of data storage systems and their corresponding components are numbered alike for simplicity, as they are, for the purposes of the present description, interchangeable.)

The data storage systems shown in FIG. 4 are in use, respectively, for applications management, inventory management, and systems management, thus forming an exemplary enterprise management system wherein information content and rules of relevance may be shared by the data storage systems to achieve improvements in the management of an enterprise.

The present invention is preferably embodied as a computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

As described above, the present invention thus provides means for unifying the processing of validation or selection for externally-generated data and internally-derived data, such that the same validation mechanisms may be applied to both. Externally derived data may be acquired from other databases, from applications or from user inputs, for example by using a keyboard or speech recognition program.

This is done by using a unified container layer to receive both externally and internally generated changes to the database. The container layer receives externally generated local inputs from users and from local applications and also receives externally generated inputs from remote databases. In a preferred embodiment of the present invention, this is done by equipping the container layer with a publish/subscribe mechanism. The unified container layer publishes its own changes and subscribes to the topic that contains such changes, such that it receives its own internally generated changes in the same way that it receives externally generated changes. Preferably, the publish/subscribe mechanism is capable of asynchronous communication.

The asynchronous publish/subscribe paradigm advantageously lends itself to intermittent networking systems, such as distributed wireless systems, as well as to statically, semi-permanently or permanently connected networks.

Advantageously, the use of the unified container layer allows all forms of data inputs to be validated in the same way, preferably using the same code component. This reduces the amount of code that is required to be loaded into the system, keeps the validation of all forms of input "in step", and thus enhances both system performance and the quality of the data from which useful information is to be derived. It also advantageously reduces the opportunity for human error in the coding of the validation processes.

In conventional systems according to the prior art, metadata describing the rules is stored in the same database as the normal data and accessed in read and write mode by the rules engine and all the validator components of the input modules. This accessibility to a plurality of potential updaters is a major drawback of the prior art systems, in that it leaves metadata, like normal data, exposed to corruption and time-sequence-related errors, unless complex measures to control access by means of locking are used.

Thus it is further advantageous that, in the present invention, the use of a unified container layer for validation offers a single point of access to metadata such that the metadata is protected from corruption by simultaneous updates from multiple input modules without the need for complex locking mechanisms. Thus, metadata can be made write-accessible only to the unified container layer, and thereby protected from out-of-sequence or other potentially erroneous, invalidated updates which might corrupt both the metadata and any data updated according to the rules represented by it.

The advantageous nature of data storage systems implemented according to the present invention will be readily understood by those skilled in the art, in particular in considering the use of a plurality of such systems connected together over communications links, when the systems can, in effect, learn from one another and thus refine the knowledge held by each. By the preferred use of a publish and subscribe technology to communicate, each can also be selective in the acquisition of new knowledge provided by any of the published data and rule changes in which it has registered an interest with the broker of the preferred embodiment. Thus, one system according to the preferred embodiment of the present invention may subscribe to a topic specifying which types of data and rule changes it has an interest in, and will therefore only receive notification of those changes which are relevant to its overall data model and goals. These data and rules changes may further be filtered after they are received, so that a more narrowly-focused acquisition of change information may be achieved.

The data storage systems according to preferred embodiments of the present invention become goal-oriented and capable of selective heuristic behavior controlled by the database owner and specified not merely by means of the active rules operating within the data storage system, but also by means of the selective nature of their subscriptions to topics in the preferred publish and subscribe system and any local filters that may be used.

While a preferred embodiment of the invention has been described, it will be readily understood by one skilled in the art that many variations may be made in embodying the present invention, without departing from its scope. For example, while the use of a publish and subscribe mechanism has been described herein, other forms of synchronous and asynchronous communication mechanisms may be used in other embodiments.

Similarly, while the preferred embodiment is described in terms of an active entity-relationship-attribute database, many other forms of active data store may be used instead. For example, an active text database stored in a hierarchical or flat file system may be used, as may any other form of data store, nor is the invention limited to databases comprising textual and numeric data, but may equally well be applied in active databases of images, active multimedia databases and the like. Furthermore, while the preferred embodiment of the present invention has been described in terms of a data storage system having an active data store which is contained in a single computer system, the present invention may equally be applied in distributed or clustered data storage systems, or in storage area networks (also known as SANs).

What is claimed is:

1. A data storage system, comprising:
an active data store comprising stored data;
a rules engine adapted to apply at least one rule to modify data of the stored data in the active data store,
a unified container layer adapted to transmit and receive data using a data communication mechanism and further adapted to publish a message to a broker located external to the data storage system by transmitting the message across the data communications mechanism to the broker,
said message being derived from the data of the stored data in the active data store that had been modified by the rules engine,
said message being received from the active data store by the unified container layer,
said unified container layer adapted to validate both externally-generated data and data of the active data store generated by the rules engine,
a first list of subscribers being stored in a data store of the broker,
each subscriber listed on the first list of subscribers subscribing to a topic associated with the message and adapted to receive the message published from the broker,
said unified container layer being listed on the first list of subscribers,
said unified container layer adapted to receive the message published from the broker due to the unified container layer being listed on the first list of subscribers,
said unified container layer adapted to process the published message received from the broker and to transmit the processed published message to the active data store;
said unified container layer comprising a sender and a receiver such that the sender and the receiver are adapted to communicate using the data communication mechanism;
said unified container layer further comprising a validator and a filter, wherein the unified container layer is adapted to process the published message received from the broker by having the published message validated by the validator and by having the validated published message filtered by the filter;
said data communication mechanism further adapted to receive data from application inputs and user inputs such that no direct access to the active data store is permitted for said inputs;
said data communication mechanism comprising a publish and subscribe data communication mechanism;
said data communication mechanism adapted to participate in data communication with said broker, using said publish and subscribe mechanism, in which said broker acts as a bus by: (1) receiving published messages by means of transmissions across said data communication mechanism, and (2) making said published messages available to subscribers by transmission of said published messages across said data communication mechanism, wherein said subscribers comprise an application or system that has registered as a first subscriber with said broker, wherein said first subscriber is on said first list of subscribers;
said broker adapted to examine subscription data in its data store and determine that said data storage system has subscribed to the topic associated with the message, as has a second data storage system;

said broker adapted to transmit the message to said subscribers, including to said data storage system, to said second data storage system, and to other subscribers, said other subscribers including applications and databases.

2. The data storage system of claim 1,
wherein the stored data comprises a first entity and a second entity connected to each other by a relationship,
wherein the first entity comprises a first attribute having a first plurality of values,
wherein the second entity comprises a second attribute having a second plurality of values,
wherein the relationship comprises a third attribute having a third plurality of values, and
wherein the rules engine is adapted to apply the at least one rule to at least one attribute of the first attribute, the second attribute, and the third attribute to generate the message.

3. The data storage system of claim 2, wherein the rules engine is adapted to apply the at least one rule to the third attribute to generate the message.

4. The data storage system of claim 1, wherein the unified container layer is further adapted to process the published message received from the broker by compressing or decompressing the published message.

5. The data storage system of claim 1, wherein the unified container layer is further adapted to process the published message received from the broker by encrypting or decrypting the published message.

6. A method for operating a data storage system that includes a unified container layer, an active data store comprising stored data, and a rules engine, said method comprising:
applying by the rules engine at least one rule to modify data of the stored data in the active data store;
receiving, by the unified container layer from the active data store, a message derived from the data of the stored data in the active data store that had been modified by the rules engine, said unified container layer adapted to transmit and receive data using a data communication mechanism;
publishing, by the unified container layer, the message to a broker located external to the data storage system by transmitting the message across the data communications mechanism to the broker, wherein a first list of subscribers is stored in a data store of the broker, each subscriber listed on the first list of subscribers subscribing to a topic associated with the message and adapted to receive the message published from the broker, said unified container layer being listed on the first list of subscribers, said unified container layer adapted to validate both externally-generated data and data of the active data store generated by the rules engine;
receiving, by the unified container layer, the message published from the broker due to the unified container layer being listed on the first list of subscribers; and
processing, by the unified container layer, the published message received from the broker and transmitting the processed published message to the active data store;
said unified container layer comprising a sender and a receiver such that the sender and the receiver are adapted to communicate using the data communication mechanism;
said unified container layer further comprising a validator and a filter, wherein the unified container layer is adapted to process the published message received from the broker by having the published message validated by the validator and by having the validated published message filtered by the filter;
said data communication mechanism further adapted to receive data from application inputs and user inputs such that no direct access to the active data store is permitted for said inputs;
said data communication mechanism comprising a publish and subscribe data communication mechanism;
said data communication mechanism adapted to participate in data communication with said broker, using said publish and subscribe mechanism, in which said broker acts as a bus by: (1) receiving published messages by means of transmissions across said data communication mechanism, and (2) making said published messages available to subscribers by transmission of said published messages across said data communication mechanism, wherein said subscribers comprise an application or system that has registered as a first subscriber with said broker, wherein said first subscriber is on said first list of subscribers;
said broker adapted to examine subscription data in its data store and determine that said data storage system has subscribed to the topic associated with the message, as has a second data storage system;
said broker adapted to transmit the message to said subscribers, including to said data storage system, to said second data storage system, and to other subscribers, said other subscribers including applications and databases.

7. The method of claim 6,
wherein the stored data comprises a first entity and a second entity connected to each other by a relationship,
wherein the first entity comprises a first attribute having a first plurality of values,
wherein the second entity comprises a second attribute having a second plurality of values,
wherein the relationship comprises a third attribute having a third plurality of values, and
wherein the method further comprises applying, by the rules engine, the at least one rule to at least one attribute of the first attribute, the second attribute, and the third attribute to generate the message.

8. The method of claim 7, wherein the method further comprises applying, by the rules engine, the at least one rule to the third attribute to generate the message.

9. The method of claim 6, wherein said processing further comprises compressing or decompressing, by the unified container layer, the published message received from the broker.

10. The method of claim 6, wherein said processing further comprises encrypting or decrypting, by the unified container layer, the published message received from the broker.

11. A computer program product, comprising computer program instructions tangibly embodied in a computer-readable medium, said instructions when loaded into a computer system and executed cause said computer system to operate a data storage system by performing a method, said data storage system including a unified container layer, an active data store comprising stored data, and a rules engine, said method comprising:
applying by the rules engine at least one rule to modify data of the stored data in the active data store;
receiving, by the unified container layer from the active data store, a message derived from the data of the stored data in the active data store that had been modified by the rules engine, said unified container layer adapted to transmit and receive data using a data communication mechanism;

publishing, by the unified container layer, the message to a broker located external to the data storage system by transmitting the message across the data communications mechanism to the broker, wherein a first list of subscribers is stored in a data store of the broker, each subscriber listed on the first list of subscribers subscribing to a topic associated with the message and adapted to receive the message published from the broker, said unified container layer being listed on the first list of subscribers, said unified container layer adapted to validate both externally-generated data and data of the active data store generated by the rules engine;

receiving, by the unified container layer, the message published from the broker due to the unified container layer being listed on the first list of subscribers; and processing, by the unified container layer, the published message received from the broker and transmitting the processed published message to the active data store;

said unified container layer comprising a sender and a receiver such that the sender and the receiver are adapted to communicate using the data communication mechanism;

said unified container layer further comprising a validator and a filter, wherein the unified container layer is adapted to process the published message received from the broker by having the published message validated by the validator and by having the validated published message filtered by the filter;

said data communication mechanism further adapted to receive data from application inputs and user inputs such that no direct access to the active data store is permitted for said inputs;

said data communication mechanism comprising a publish and subscribe data communication mechanism;

said data communication mechanism adapted to participate in data communication with said broker, using said publish and subscribe mechanism, in which said broker acts as a bus by: (1) receiving published messages by means of transmissions across said data communication mechanism, and (2) making said published messages available to subscribers by transmission of said published messages across said data communication mechanism, wherein said subscribers comprise an application or system that has registered as a first subscriber with said broker, wherein said first subscriber is on said first list of subscribers;

said broker adapted to examine subscription data in its data store and determine that said data storage system has subscribed to the topic associated with the message, as has a second data storage system;

said broker adapted to transmit the message to said subscribers, including to said data storage system, to said second data storage system, and to other subscribers, said other subscribers including applications and databases.

12. The computer program product of claim 11, wherein the method further comprises applying, by the rules engine, the at least one rule to the third attribute to generate the message.

13. The computer program product of claim 11, wherein said processing further comprises compressing or decompressing, by the unified container layer, the published message received from the broker.

14. The computer program product of claim 11, wherein said processing further comprises encrypting or decrypting, by the unified container layer, the published message received from the broker.

15. The computer program product of claim 11, wherein said method further comprises:

receiving, by the unified container layer, an external message from outside the data storage system, wherein a second list of subscribers who subscribe to a topic associated with the external message is stored in the data store of the broker;

publishing, by the unified container layer, the external message to the broker;

receiving, by the unified container layer, the published external message from the broker;

processing, by the unified container layer, the published external message received from the broker by having the published external message validated by the validator and by having the validated published external message filtered by the filter; and transmitting, by the unified container layer, the processed published external message to the subscribers on the second list of subscribers.

* * * * *